US010635428B2

(12) United States Patent
Nidumolu (10) Patent No.: US 10,635,428 B2
(45) Date of Patent: Apr. 28, 2020

(54) SYSTEM AND METHOD FOR IN-SERVICE UPDATE OF SOFTWARE (71) Applicant: Arista Networks, Inc., Santa Clara, CA (US)

(72) Inventor: Kalyan Nidumolu, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/025,823

(22) Filed: Jul. 2, 2018

(65) Prior Publication Data
US 2019/0303129 A1 Oct. 3, 2019

Related U.S. Application Data (60) Provisional application No. 62/650,512, filed on Mar. 30, 2018.

(51) Int. Cl.
*G06F 8/65* (2018.01)
*G06F 9/4401* (2018.01)
(Continued)

(52) U.S. Cl.
CPC ............... *G06F 8/65* (2013.01); *G06F 8/61* (2013.01); *G06F 8/656* (2018.02); *G06F 8/658* (2018.02);
(Continued)

(58) Field of Classification Search
CPC .. G06F 8/60–71; G06F 16/245; G06F 9/4401; G06F 11/1464; G06F 2201/84
(Continued)

(56) References Cited

U.S. PATENT DOCUMENTS 6,052,531 A * 4/2000 Waldin, Jr. ............... G06F 8/64
717/170
6,493,871 B1 * 12/2002 McGuire .................. G06F 8/65
717/169
(Continued)

FOREIGN PATENT DOCUMENTS

WO 2016/033785 A1 3/2016
WO 2018/160600 A2 9/2018

OTHER PUBLICATIONS

Luis Pina et al.; "Atomic Dynamic Upgrades Using Software Transactional Memory"; IEEE Press; Proceedings of the 4th International Workshop on Hot Topics in Software Upgrades (HotSW-Up '12); pp. 21-25; Jun. 2012.
(Continued)

*Primary Examiner* — Geoffrey R St Leger
(74) *Attorney, Agent, or Firm* — Chamberlain, Hrdlicka, White, Williams & Aughtry (57) ABSTRACT Embodiments of the invention may relate to method. In one or more embodiments of the invention, the method includes receiving, by a network device, a command to initiate a control plane reboot. The method may also include extracting, based on the command, a transitional update database from a software image that includes a new software version and the transitional update database. The method may also include performing a query to determine whether the transitional update database includes a required transitional update for performing an upgrade to the new software version; installing, when the query determines that the required transitional update is included in the software image, the required transitional update; and performing, after installation of the transitional update is complete, the control plane reboot to complete the upgrade to the new software version.

20 Claims, 3 Drawing Sheets (51) Int. Cl.
  *G06F 11/14* (2006.01)
  *G06F 16/245* (2019.01)
  *G06F 8/656* (2018.01)
  *G06F 8/61* (2018.01)
  *H04L 12/771* (2013.01)
  *H04L 29/08* (2006.01)
  *G06F 8/658* (2018.01)

(52) U.S. Cl.
  CPC ........ *G06F 9/4401* (2013.01); *G06F 11/1464* (2013.01); *G06F 16/245* (2019.01); *H04L 45/563* (2013.01); *H04L 67/34* (2013.01); *G06F 2201/84* (2013.01)

(58) Field of Classification Search
  USPC .................................................. 717/168–178
  See application file for complete search history.

(56) References Cited

U.S. PATENT DOCUMENTS

| | | | |
|---|---|---|---|
| 6,601,227 B1 | 7/2003 | Trimberger | |
| 6,618,857 B1* | 9/2003 | Zimniewicz | G06F 8/63 |
| | | | 707/999.202 |
| 6,633,878 B1 | 10/2003 | Underwood | |
| 6,639,910 B1 | 10/2003 | Provencher et al. | |
| 6,718,535 B1 | 4/2004 | Underwood | |
| 6,754,175 B1 | 6/2004 | Akinpelu et al. | |
| 7,062,567 B2 | 6/2006 | Benitez et al. | |
| 7,127,713 B2 | 10/2006 | Davis et al. | |
| 7,213,152 B1* | 5/2007 | Gafken | G06F 8/65 |
| | | | 713/187 |
| 7,483,370 B1 | 1/2009 | Dayal et al. | |
| 7,506,338 B2 | 3/2009 | Alpern et al. | |
| 7,979,530 B1 | 7/2011 | Lee | |
| 8,171,466 B2 | 5/2012 | Langen et al. | |
| 8,448,162 B2 | 5/2013 | Ramanathan et al. | |
| 8,849,949 B1* | 9/2014 | Pani | H04L 49/65 |
| | | | 709/204 |
| 8,943,491 B2 | 1/2015 | Brogan et al. | |
| 8,959,215 B2 | 2/2015 | Koponen et al. | |
| 9,042,402 B1 | 5/2015 | Loganathan et al. | |
| 9,106,581 B1 | 8/2015 | Mackie et al. | |
| 9,880,829 B2 | 1/2018 | Katiyar et al. | |
| 10,031,763 B1* | 7/2018 | Siebenthaler | G06F 13/4022 |
| 10,079,781 B2 | 9/2018 | Cheng et al. | |
| 2005/0114852 A1* | 5/2005 | Chen | G06F 8/65 |
| | | | 717/168 |
| 2007/0220358 A1* | 9/2007 | Goodill | H04L 1/22 |
| | | | 714/43 |
| 2009/0277346 A1 | 11/2009 | Godecke et al. | |
| 2012/0173691 A1 | 7/2012 | Kothe et al. | |
| 2013/0282884 A1 | 10/2013 | Chandrasekaran et al. | |
| 2014/0086241 A1 | 3/2014 | Assarpour | |
| 2014/0269254 A1* | 9/2014 | Choorakkot Edakkunni | H04L 41/082 |
| | | | 370/218 |
| 2014/0337674 A1 | 11/2014 | Ivancic et al. | |
| 2015/0040115 A1 | 2/2015 | Capper | |
| 2015/0120905 A1 | 4/2015 | Leogrande et al. | |
| 2015/0149658 A1* | 5/2015 | Wei | H04L 45/563 |
| | | | 709/242 |
| 2016/0014023 A1 | 1/2016 | He et al. | |
| 2016/0094668 A1 | 3/2016 | Chang et al. | |
| 2016/0210135 A1 | 7/2016 | Wroblewski et al. | |
| 2016/0234104 A1 | 8/2016 | Hoffmann | |
| 2016/0315803 A1 | 10/2016 | Sadana et al. | |
| 2016/0342510 A1 | 11/2016 | Pani | |
| 2016/0352865 A1 | 12/2016 | Gupta et al. | |
| 2017/0168803 A1 | 6/2017 | Katiyar et al. | |
| 2018/0136940 A1* | 5/2018 | Mallichan | G06F 9/4406 |
| 2018/0139238 A1 | 5/2018 | Schultz et al. | |
| 2018/0239611 A1 | 8/2018 | Hu et al. | |

OTHER PUBLICATIONS

Sander van der Burg; "A Generic Approach for Deploying and Upgrading Mutable Software Components"; IEEE Press; Proceedings of the 4th International Workshop on Hot Topics in Software Upgrades (HotSWUp '12); pp. 26-30, Jun. 2012.
Daniel Cederman et al.; "Supporting Lock-Free Composition of Concurrent Data Objects: Moving Data between Containers"; IEEE Transactions on Computers; vol. 62, No. 9; pp. 1866-1878; Sep. 2013.
Katelin A. Bailey et al.; "Trusted Virtual Containers on Demand"; Proceedings of the 5th ACM Workshop on Scalable Trusted Computing (STC '10), ACM, Chicago, Illinois; pp. 63-72; Oct. 4, 2010.
Nikhil Handigol et al.; "Reproducible Network Experiments Using Container-Based Emulation"; Proceedings of the 8th International Conference on Emerging Networking Experiments and Technologies (CoNEXT '12), ACM, Nice, France; pp. 253-264; Dec. 10-13, 2012.
Tudor Dumitras; "Dependable, Online Upgrades in Enterprise Systems"; Proceedings of the 24th ACM SIGPLAN Conference Companion on Object Oriented Programming Systems Languages and Applications (OOPSLA '09), ACM, Orlando, Florida; pp. 835-836; Oct. 25-29, 2009.
Faris Keti et al.; "Emulation of Software Defined Networks Using Mininet in Different Simulation Environments"; IEEE 6th International Conference on Intelligent Systems, Modelling and Simulation; pp. 205-210; Feb. 2015.
Jim Bardgett et al. "nSwitching: Virtual Machine Aware Relay Hardware Switching to improve intra-NIC Virtual Machine Traffic"; IEEE ICC 2012—Next-Generation Networking Symposium; pp. 2700-2705; Jun. 10-15, 2012.

* cited by examiner

SYSTEM AND METHOD FOR IN-SERVICE UPDATE OF SOFTWARE

BACKGROUND

Network devices often include installed and/or executing instances of software (e.g., an operating system). Such network devices may have such software updated (e.g., upgraded) from time to time. Software updates on network devices may require installation, prior to the update, of additional updates to prepare the network device, at least in part, for the software update. There may be any number of such additional updates, and manual installation of the additional updates may be time-consuming, cumbersome, and/or prone to error.

SUMMARY

In general, in on aspect, embodiments of the invention relate to method. In one or more embodiments of the invention, the method includes receiving, by a network device, a command to initiate a control plane reboot. The method may also include extracting, based on the command, a transitional update database from a software image that includes a new software version and the transitional update database. The method may also include performing a query to determine whether the transitional update database includes a required transitional update for performing an upgrade to the new software version; installing, when the query determines that the required transitional update is included in the software image, the required transitional update; and performing, after installation of the transitional update is complete, the control plane reboot to complete the upgrade to the new software version.

In general, in one aspect, embodiments of the invention relate to a non-transitory computer readable medium that includes instructions which, when executed by a processor, perform a method. In one or more embodiments of the invention, the method includes receiving, by a network device, a command to initiate a control plane reboot. The method implemented by execution of the instructions may also include extracting, based on the command, a transitional update database from a software image that includes a new software version and the transitional update database. The method implemented by execution of the instructions may also include performing a query to determine whether the transitional update database includes a required transitional update for performing an upgrade to the new software version; installing, when the query determines that the required transitional update is included in the software image, the required transitional update; and performing, after installation of the transitional update is complete, the control plane reboot to complete the upgrade to the new software version.

In general, in one aspect, embodiments of the invention relate to a network device. In one or more embodiments of the invention, the network device includes a processor, memory, and a network device data repository configured to store a software image comprising a new software version and a transitional update database that includes a transitional update. The network device may also include a command interface configured to receive a command to initiate a control plane reboot and transmit the command to a command handler. The command handler may be configured to receive the command from the command interface; parse the command; extract, based on the command, the transitional update database from the software image; perform a query to determine whether the transitional update database includes a required transitional update for performing an upgrade to the new software version; install, when the query determines that the required transitional update is included in the software image, the required transitional update; and perform, after installation of the transitional update is complete, the control plane reboot to complete the upgrade to the new software version.

DETAILED DESCRIPTION

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to installation of transitional updates for software during an accelerated software upgrade (ASU). Specifically, in one or more embodiments of the invention, once a determination is made that software of a network device, such as a network device operating system, should be updated, a software image is stored in storage of the network device.

In one or more embodiments of the invention, the software image includes both a new software version (e.g., a new version of a network device operating system) and any number of transitional updates to be installed on the network device prior to installation of the new software version. A transitional update may be an update (e.g., a patch) to be applied to the network device in order to facilitate, at least in part, the transition from an older software version to a new software version. For example, a transitional update may execute some amount of code in order to assist with convergence to the new software version from the old software version, save data needed by the new software version after a reboot of a portion of the software and/or hardware of the network device that was not being saved by the older software version, etc.

Figure 1:
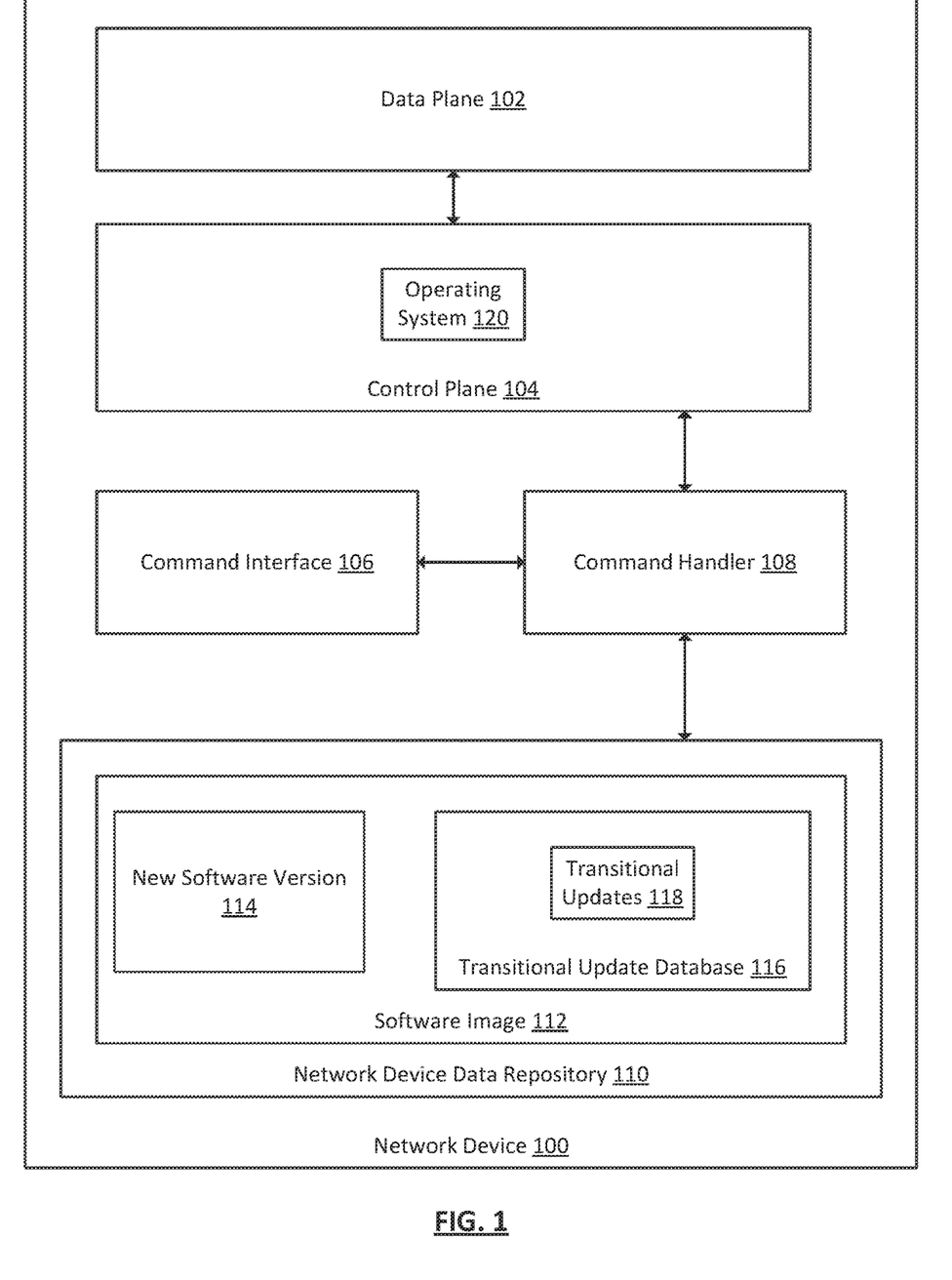
FIG. 1 shows a network device in accordance with one or more embodiments of the invention.

FIG. 1 shows a network device in accordance with one or more embodiments of the invention. As shown in FIG. 1, the network device (100) includes a data plane (102), a control plane (104), a command interface (106), a command handler (108), and a network device data repository (110). The control plane may include an operating system (120) The network device data repository (110) may include a software image (112) that may include a new software version (114) and a transitional update database (116). The transitional update database (116) may include any number of transitional updates (118). Each of these components is described below.

In one or more embodiments of the invention, a network device (100) may be a physical device that includes and/or may operatively connected to persistent storage (e.g., network device data repository (110)), memory (e.g., random access memory (RAM)) (not shown), one or more processor(s) (e.g., integrated circuits) (not shown), and two or more physical network interfaces (which may also be referred to as ports). As used herein, the term operatively connected, or operative connection, means that there exists between elements/components a direct or indirect connection that allows the elements to interact with one another in some way (e.g., transfer data, execute commands or instructions, etc.).

A network device (100) may be configured to receive network data units (e.g., packets, frames, etc.) via the network device interfaces or ports, and determine whether to: (i) drop the network data unit; (ii) process the network data unit in accordance with one or more embodiments of the invention; and/or (iii) send the network data unit, based on the processing, from another network interface or port on the network device (100) in accordance with one or more embodiments of the invention.

How the network device (100) makes the determination of whether to drop a network data unit, and/or send a network data unit to another component in the network device (100) or another device on the network may depend, in part, on whether the network device (100) is a layer-2 (L2) network device or a layer-3 (L3) network device, which may perform at least some functions of a router, or is capable of both L2 and L3 functionality (e.g., a multilayer switch).

For example, if the network device (100) is operating as a L2 network device, the network device (100) may use, for example, a destination Media Access Control (MAC) along with a forwarding table or policy to determine out of which network interface or port to send the network data unit. As another example, if the network device (100) is operating as a L3 network device, the network device (100) may use a destination Internet Protocol (IP) address along with a routing table or policy to determine out of which network interface or port to send the network data unit, and includes the ability to write the MAC address of the next hop to receive the network data unit in place of a MAC address associated with a port of the network device (which, for example, the last hop or component in the network to send the network data unit may have written) in the L2 header information included as part of the network data unit. If the network device (100) is a multilayer switch, the network device (100) may include functionality to process network data units using both MAC address and IP addresses.

In one or more embodiments of the invention, the persistent storage and/or non-persistent storage or memory of a network device (100) may include any type of non-transitory computer readable medium (CRM) that includes software instructions in the form of computer readable program code, which may be stored in whole or in part, and permanently or temporarily. Examples of the non-transitory computer readable medium include, but are not limited to, flash memory devices (e.g., Universal Serial Bus (USB) flash drives, solid state drives, etc.), magnetic and/or mechanical storage devices (e.g., hard drive, diskette, tape storage, etc.), optical storage devices (e.g., compact disc (CD), digital versatile disc (DVD), Blu-ray disc, etc.), and random access memory (RAM). Further, when executed by the one or more computer processor(s), the software instructions may enable the network device (100) to perform one or more embodiments of the invention described below (see e.g., FIG. 2).

Examples of a network device (100) include, but are not limited to, a switch, a router, and a multilayer switch. Network devices are not limited to the aforementioned examples.

In one or more embodiments of the invention, the network device (100) includes a data plane (102). In one or more embodiments of the invention, the data plane (102) includes any hardware (e.g., circuitry), software, firmware, or any combination thereof of the network device (100), and includes functionality to make decisions regarding actions to take in response to receipt of a network data unit (e.g., packet, frame, etc.). As discussed above, such actions may include dropping the network data unit, or processing the network data unit based at least in part on some information (e.g., MAC address, IP address) included therein.

Processing of a network data unit by the data plane (102) may include, for example, identifying a port of a network device from which a received network data unit should be forwarded, and transmitting the received network data unit through the internal fabric (not shown) of the network device in order to facilitate the forwarding of the network data unit from the identified port. Such forwarding functionality of the data plane (102) may require, at least in part, any number of tables (e.g., a forwarding information base). Such tables may include information that associates any item of information included in a received network data unit with a port of the network device that is operatively connected to a destination device, thereby facilitating the forwarding, by the network device, of the network data unit towards a destination device (e.g., forwarding the network data unit to a next hop device).

In one or more embodiments of the invention, the data plane (102) is operatively connected, at least, to a control plane (104) of the network device. In one or more embodiments of the invention, the one or more tables of the data plane (102) are programmed (e.g., table entries are added, removed, modified, etc.) by software executing in the control plane (104) using information stored by the control plane (e.g., information in one or more routing information bases).

In one or more embodiments of the invention, the network device (100) includes a control plane (104). In one or more embodiments of the invention, the control plane (104) includes any hardware (e.g., circuitry), software, firmware, or any combination thereof of the network device (100), and includes functionality to obtain information related to a network topology, store the information (e.g., in a one or more routing information bases (RIBS) corresponding to any number of routing protocols), and provide at least a portion of the information to the data plane (102) to build, for example, the forwarding information base. In one or more embodiments of the invention, the control plane also includes and/or is operatively connected to a management plane (not shown), which may include additional functionality for managing a network device, such as, for example, configuration, device monitoring, network policy implementation, etc.

In one or more embodiments of the invention, the control plane (104) also includes an operating system (120), which may or may not be considered part of the management plane. In one or more embodiments of the invention, a network device operating system (120) is software executing on a network device that manages, at least in part, all or a portion of the network device hardware, as well as other software executing on the network device (e.g., routing functionality, data plane programming, device management features, device monitoring features, etc.).

For example, a network device operating system (120) may manage access and use of physical and/or virtual resources (e.g., processors, memory, storage, network device chips, ports, etc.) of a network device (100) for use by software executing on the network device (e.g., one or more processes, threads, tasks, etc.). One non-limiting example of a network device operating system (120) is a Linux-based operating system. Other types of operating systems may be included without departing from the scope of the invention.

In one or more embodiments of the invention, the operating system (120) may include and/or be operatively connected to storage of the network device (100), which may include a system database (not shown). In one or more embodiments of the invention, a system database is a data construct that stores any information relevant to the state of the network device, and which may be used, at least in part, by a network device operating system (120) for performing various types of functionality.

In one or more embodiments of the invention, the control plane (104) is operatively connected to (as shown in FIG. 1), or includes, a command handler (108). In one or more embodiments of the invention, a command handler (108) is any hardware (e.g., circuitry), software, firmware, or any combination thereof, that includes functionality to facilitate the execution of commands on a network device (100). In one or more embodiments of the invention, the command handler (108) is a portion of the operating system (120). In other embodiments of the invention, the command handler (108) is an instance of software (i.e., a process) that is separate from the operating system (120).

In one or more embodiments of the invention, the command handler (108) includes any number of plug-ins (not shown) for facilitating execution of commands. At least a portion of such plug-ins may implement the ability to parse individual commands by providing parsing rules and/or handlers (not shown) for various commands. In one or more embodiments of the invention, the rules and various handlers of the command handler (108) may be referred to, at least in part, as a parser (not shown). In one or more embodiments of the invention, a parser performs a syntactic analysis on a string of symbols and/or characters that are intended as a command to be executed. In one or more embodiments of the invention, if a command is successfully parsed, the command may be executed by the command handler (108). In one or more embodiments of the invention, the command handler (108) is operatively connected to a command interface (106).

In one or more embodiments of the invention, a command interface (106) is any hardware (e.g., circuitry), software, firmware, or any combination thereof that is included in a network device (100). In one or more embodiments of the invention, a command interface (106) is instantiated whenever a connection is made to a network device (100), and/or may exist when the network device (100) is operating. Such a connection may be made, at least in part, using any of the aforementioned types of physical interfaces of a network device (100) (e.g., via a port, serial port, console port, auxiliary port, etc.).

The connections (not shown) may be initiated by any entity (not shown) seeking to execute one or more commands on a network device (100). Examples of such entities include, but are not limited to, a user, a remote network device management application, a local network device management application, certain command line symbols (e.g., a Linux 'pipe'), etc. In one or more embodiments of the invention, a connection to a network device (100) may be a non-interactive connection, an interactive connection, or a connection facilitated, at least in part, by a an application programming interface (API). Connection types are not limited to the aforementioned examples. In one or more embodiments of the invention, a command interface (106) may include functionality to receive commands from local shells, terminals, remote processes, other software of the device, etc.

In one or more embodiments of the invention, a command interface (106) includes functionality to communicate with a command handler (108) via an operative connection. Such communication may occur in order to provide any type of information (e.g., one or more commands, socket information, environment information, identifiers, controlling terminal information, user credentials, connection types, data structures to facilitate input, output, statistics, error information related to command execution, etc.) to the command handler (108).

One example of a command which may be executed by a command handler (108) is a command which reboots (i.e., reloads) the control plane without restarting the entire network device. Execution of such a command may allow for a control plane reboot while still allowing the network device to process incoming network data units using the data plane. Other commands may be executed by the command handler (108) without departing from the scope of the invention.

In one or more embodiments of the invention, the command handler (108) is operatively connected to a network device data repository (110). In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository (110) includes all or any portion of the persistent and/or non-persistent storage of the network device (100) that is described above.

In one or more embodiments of the invention, the network device data repository (110) includes, at least a portion of the time, a software image (112), which may be stored in the network device data repository (110) using any method for transferring data to a data repository (e.g., via a USB key attached to the network device (100), over a network, from an external optical storage device that is attached to the network device, etc.). In one or more embodiments of the invention, a software image (112) is one or more files that include software which, once installed, may execute on a network device (100). For example, a software image (112) may include a compressed version of an operating system, along with device drivers, software applications, management software, etc.

In one or more embodiments of the invention, the software image (112) includes a new software version (114). In one or more embodiments of the invention, a new software version (114) is any version of software that is different in any way from software already installed and/or executing on the network device (100) (which may be referred to as old software). For example, the new software version (114) may be an updated version of a network device operating system that is intended to be installed on the network device (100) to replace the existing (i.e., old) operating system.

In one or more embodiments of the invention, the software image (112) also includes a transitional update database (116). In one or more embodiments of the invention, a transitional update database (116) is any database that stores any data for facilitating an installation of a new software version (114) on a network device.

In one or more embodiments of the invention, the transitional update database includes transitional updates (118). In one or more embodiments of the invention, a transitional update (118) is any one or more files and/or scripts for executing prior to installation of a new software version (114).

For example, a transitional update (118) may be and/or include a RPM Package Manager (.rpm) file, a Bash script, a batch file, etc. In one or more embodiments of the invention, a transitional update (118), when applied to a network device (100), may alter the operation of any hardware and/or software of the network device (100) in order to facilitate successful deployment of a new software version (114) on the network device (100).

In one or more embodiments of the invention, the transitional update database (116) also includes information, organized in any manner (i.e., in a table) that indicates one or more transitional updates that should be installed on a given network device based on information about the network device. Such information may be accessed, for example, by performing a query on the transitional update database. Such information may include, for example, the old software version currently executing on the network device and/or platform information. In one or more embodiments of the invention, platform information includes, but is not limited to, device model information, backplane information, family of models information, information related to any other components of the network device, versions of any software executing on a network device, connection information related to a network device, etc. Platform information is not limited to the aforementioned examples.

While FIG. 1 shows a configuration of components, other configurations may be used without departing from the scope of the invention. For example, the network device may include additional components or elements that are not shown, one or more components and/or elements shown may not be present, any number of elements or components may be combined, omitted, or repeated, and/or the network device may be operatively connected to and/or include any number of other devices and/or components. Accordingly, embodiments of the invention should not be limited to the configuration of components and elements shown in FIG. 1.

Figure 2:
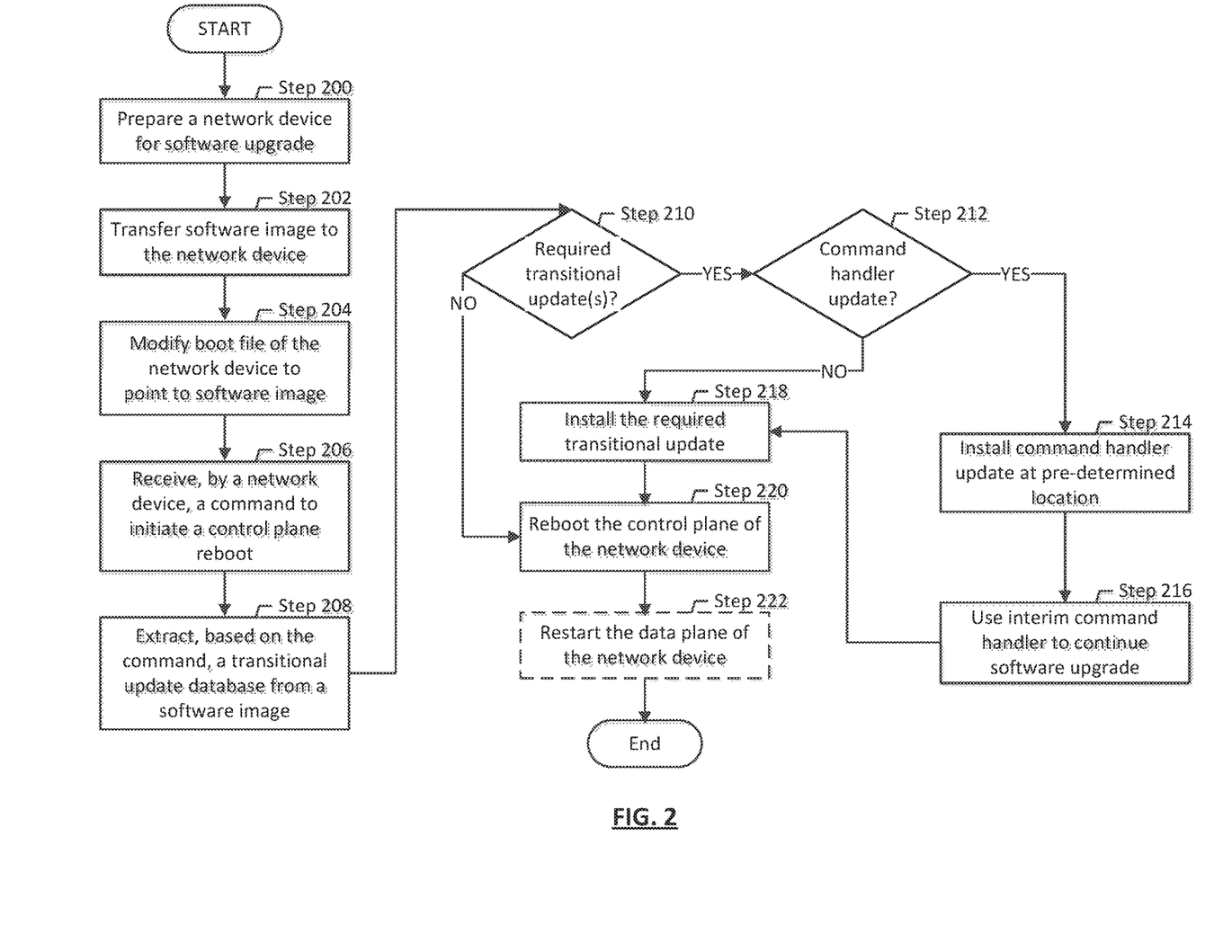
FIG. 2 shows a flowchart in accordance with one or more embodiments of the invention.

FIG. 2 shows a flowchart describing a method for applying required transitional updates in order to install a new software version in accordance with one or more embodiments of the invention. While the various steps in the flowchart are presented and described sequentially, one of ordinary skill in the art and having the benefit of this Detailed Description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 200, a network device is prepared for a software upgrade. In one or more embodiments of the invention, preparing the network device includes, but is not limited to, ensuring that a copy of the configuration running on the network device is created as a backup for use if the upgrade process fails in some way and/or gets corrupted. Such a backup may include backing up a currently executing software instance of the network device.

For example, a user may access a network device via a command interface and enter a command that causes the running configuration to be copied to a specified location in storage included in and/or operatively connected to the network device.

In one or more embodiments of the invention, preparing the network device includes any number of additional tasks. Examples of such tasks may include, but are not limited to, checking the size of a software image that includes a new software version and a transitional update database, verifying that the storage on which the software image is to be stored includes a sufficient amount of space to store the software image, and/or verifying that the network device has an appropriately configured management interface such that the network device is accessible (e.g., through a network).

In Step 202, a software image is transferred to a network device. In one or more embodiments of the invention, transferring a software image to a network device includes any method of obtaining a software image file and storing it in storage included in and/or accessible by the network device (e.g., during a control plane reboot).

For example, a user may access a management interface of the network device to point to a repository from which a software image may be downloaded, and then download the software image to a flash storage device of the network device. Examples of repositories from which a software image may be obtained include, but are not limited to, a USB memory device, a file transfer protocol (FTP) server, a remote host accessible using secure copy (SCP), and/or a server accessible using a hypertext transfer protocol (HTTP) request.

In Step 204, a boot file of the network device is modified to point to the location in storage where the software image was stored in Step 202. In one or more embodiments of the invention, a boot file is a configuration file that includes information used when a network device, or portion thereof (e.g., a control plane) is rebooted and/or restarted.

In one or more embodiments of the invention, modifying the boot image includes updating the information therein to include, at least, a location in storage where the software image stored in Step 202 is stored. For example, a user may access a command interface of a network device to execute one or more commands that update a boot configuration file to include the location information of the software image. The boot file may be updated to include any other information without departing from the scope of the invention. For example, the boot file may be updated to include information that, when checked prior to a reboot of a control plane, indicates that a transitional update database should be checked to determine if any transitional updates are required before rebooting into a new software version.

In Step 206, a network device receives a command to initiate a reboot of a control plane without restarting the network device on which the control plane executes. Such a reboot may be referred to, for example, as a fast reboot. In one or more embodiments of the invention, during such a reboot of the control plane, the data plane and/or any other component or element of the network device may continue functioning so that the network device continues to perform at least a portion of the functionality associated with the network device (e.g., forwarding network data units).

In Step 208, a transitional update database is extracted from the software image based on the execution of the command entered in Step 206 to reboot the control plane of a network device. For example, the execution of the reboot command may cause a check of the boot file to determine if the boot file includes any information indicating that a new software version is being installed and/or deployed on the network device.

In Step 210, a determination is made whether there are any required transitional updates that need to be applied to the network device before, during, and/or after the reboot to the a software version. In one or more embodiments of the invention, the determination is made by performing a query of the information in the transitional information database and information related to the network device being upgraded. For example, the transitional update database may include a table that indicates that if the network device is currently executing a certain version of an operating system, and also has certain platform information (e.g., model type), then a certain one or more transitional updates should be applied. In one or more embodiments of the invention, if no transitional updates are required, the process continues to Step 220. If, on the other hand, a determination is made that one or more transitional updates are required, the process proceeds to Step 212.

In Step 212, a determination is made whether any of the one or more required transitional updates are an update to the command handler of the network device. In one or more embodiments of the invention, if none of the one or more required transitional updates include an update to the command handler, the process continues to Step 218. If, on the other hand, one or more of the transitional updates include an update to the command handler, the process proceeds to Step 214.

In Step 214, an updated command handler is installed at a pre-determined location. The pre-determined location may be any location in persistent and/or non-persistent storage or memory of the network device. In one or more embodiments of the invention, the command handler update is installed at a pre-determined location because an update to the command handler may require the currently executing command handler to be ended in order to apply the update. In other embodiments of the invention, the existing command handler is not ended. Rather, since the new handler is installed at a well-known location, the existing handler may open the new handler and may start executing from a well-known function. In one or more embodiments of the invention, when that function returns, the existing handler also returns.

In Step 216, the updated command handler installed in Step 214, which may be referred to as an interim command handler, continues the software upgrade. In one or more embodiments of the invention, continuing the software upgrade may include, but is not limited to performing any additional steps (e.g., Steps 218 and 220, discussed below) necessary to upgrade a software version of the network device, and the additional steps are performed using the interim command handler rather than the command handler from which the control plane reboot was initiated in Step 206.

In Step 218, any one or more required transitional updates are installed. In one or more embodiments of the invention, installation of one or more transitional updates may include making any changes to any hardware and/or software of the network device prior to rebooting into a new software version that was included in the software image transferred to the network device in Step 202. For example, new code may be stored, or existing code may be modified, for execution before, during, or after the control plane reboot. As another example, some portion of the software of the network device (e.g., the operating system) may be updated and/or modified to cause storage of data that was not previously being saved by the old software version that is being updated in accordance with one or more embodiments of the invention.

In Step 220, the control plane of the network device is rebooted. In one or more embodiments of the invention, rebooting the control plane of the network device causes a reload of the control plane and associated software (e.g., the operating system). In one or more embodiments of the invention, the reboot of the control plane (e.g., a fast reboot) causes a reload of the control plane, but does not otherwise restart the network device. Accordingly, other components of the network device, such as the data plane, may continue to operate during the reboot of the control plane.

In Step 222, after the control plane has been fully rebooted, and a verification has been performed that the new software version is executing, the data plane of the network device may be optionally rebooted. In one or more embodiments of the invention, the data plane is rebooted if the upgrade to the new software version makes some change to how the control plane interacts with the data plane. In one or more embodiments of the invention, the restart of the data plane causes minimal downtime (e.g., approximately thirty seconds). In one or more embodiments of the invention, the data plane is not rebooted, in which case the downtime may be even less (e.g., less than one second).

Figure 3:
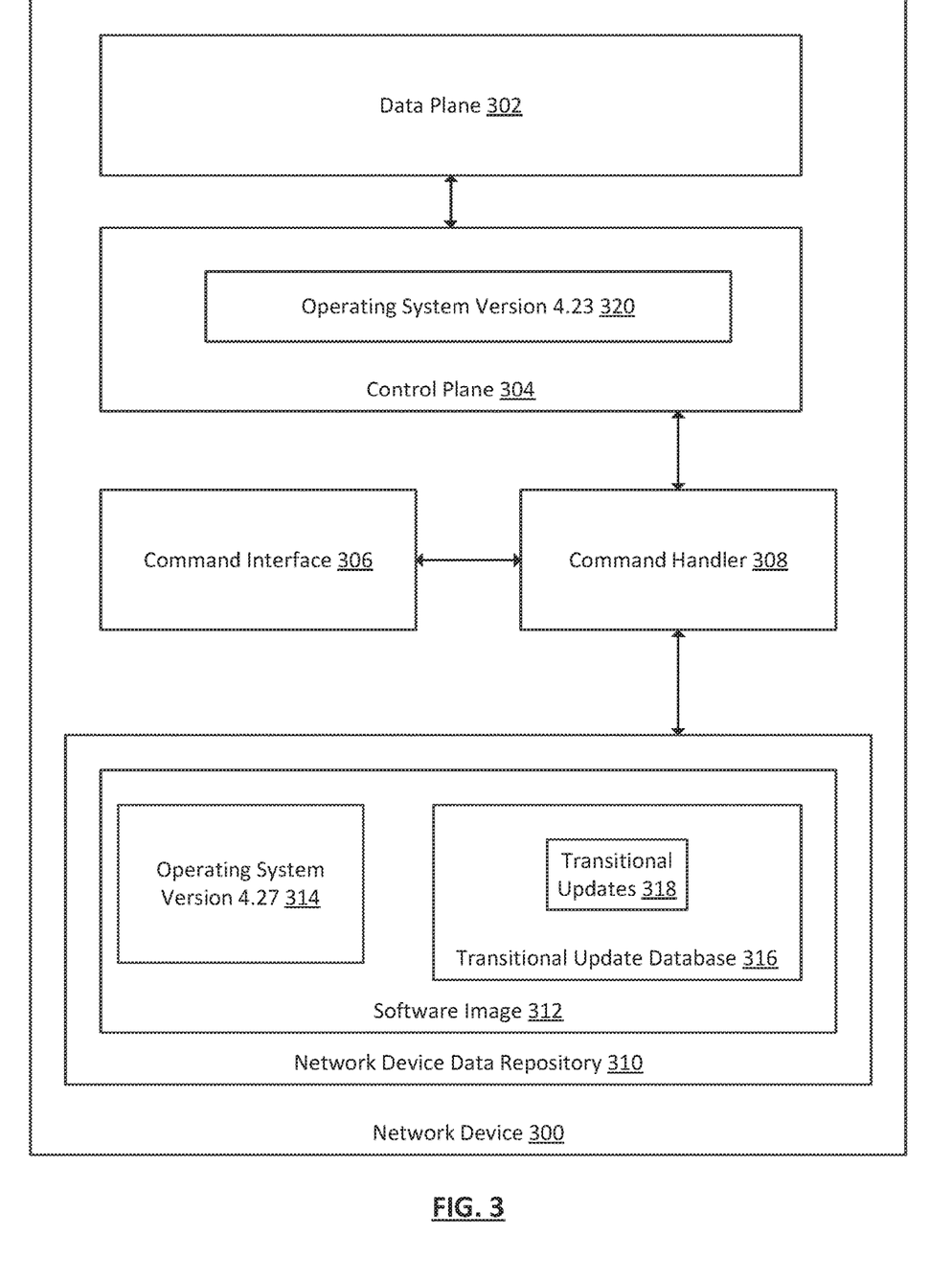
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which a network device (300) has been prepared for an operating system upgrade, a software image (312) has been transferred to a network device data repository (310), and a boot file of the network device (300) has been modified to point to the software image (312) stored in the network device data repository (310). The model type of the network device (300) is the AZD27000.

In such a scenario, the network device (300) is to be updated from operating system version 4.23 (320) that is currently executing in the control plane (304) of the network device (300) to a new software version, operating system version 4.27 (314).

In order to initiate the operating system upgrade, a user (not shown) accesses the command interface (306) of the network device (300) and enters the command "reload-fast boot". The command, and any additional information that may be required for execution of the command, is then transferred to the command handler (308). In response to receipt of the command, the command handler first checks the transitional update database (316) included in the software image (312) to determine if any required transitional updates.

The transitional update database (316) includes a table that allows the command handler to discover that a network device (300) of model AZD2700 that is currently executing operating system 4.23 (320) requires one transitional update (318) to be installed. The transitional update (318) includes storing code in a certain location on the network device for execution during the reboot of the control plane. Accordingly, prior to the reboot of the control plane (304), the command handler extracts the code from the software image (312) and stores the code in the required location.

Next, the command handler initiates a reboot of the control plane (304). During the reboot, the code of the transitional update is executed to facilitate, in part the upgrade to the new operating system version 4.27 (318) from the old operating system version (320). Additionally, because the boot file has been properly modified, the network device will boot the control plane to the new operating system version 4.27 (318).

After the reboot of the control plane (304), the user may verify that operating system version 4.27 (320) is properly executing on the network device. After the verification, the data plane is then rebooted.

In one or more embodiments of the invention, the installation/application of one or more required transitional updates necessary to facilitate, at least in part, an upgrade from an old software version to a new software version occurring automatically as part of the upgrade process reduces the need for entities to manually apply the transitional updates to the network device, which may reduce the number of errors in the upgrade process, and/or reduce the time required to upgrade a network device.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
    receiving, by a network device, a command to initiate a control plane reboot of a control plane of the network device;
    extracting, based on the command, a transitional update database from a software image stored in storage of the network device comprising a new software version and the transitional update database comprising a plurality of transitional updates and an update requirements data structure;
    performing a query, using the update requirements data structure, to determine whether the plurality of transitional updates in the transitional update database includes a required transitional update for performing an upgrade to the new software version;
    installing, when the query determines that the required transitional update is included in the software image, the required transitional update; and
    performing, after installation of the required transitional update is complete, the control plane reboot to complete the upgrade to the new software version.

2. The method of claim 1, further comprising, before installing the required transitional update:
    performing a check to determine whether the required transitional update comprises a command handler update;
    installing, when the check determines that the required transitional update includes the command handler update, the command handler update at a pre-determined location to obtain an updated interim command handler; and
    using the updated interim command handler for continuing the installing of the required transitional update and the control plane reboot.

3. The method of claim 1, further comprising, before receiving the command;
    backing up a currently executing software instance of the network device;
    storing the software image on a storage device of the network device; and
    modifying a boot file of the network device to point to a location of the software image.

4. The method of claim 3, further comprising:
    performing, when the query determines that no required transitional update is included in the software image, the control plane reboot without installing any required transitional update.

5. The method of claim 1, wherein performing the query comprises determining a current software version executing on the network device and platform information of the network device.

6. The method of claim 5, wherein performing the query further comprises using the current software version and the platform information to identify the required transitional update and obtain the required transitional update from the transitional update database.

7. The method of claim 6, wherein the platform information comprises one selected from a group consisting of device model information, backplane information, family of models information, information related to another component of the network device, versions of other software executing on the network device, and connection information.

8. The method of claim 1, further comprising, after rebooting the control plane, restarting a data plane of the network device.

9. A non-transitory computer readable medium comprising instructions that, when executed by a processor, perform a method comprising:
    receiving, by a network device, a command to initiate a control plane reboot of a control plane of the network device;
    extracting, based on the command, a transitional update database from a software image comprising a new software version and the transitional update database;

performing a query to determine whether the transitional update database includes a required transitional update for performing an upgrade to the new software version;

installing, when the query determines that the required transitional update is included in the software image, the required transitional update;

performing, after installation of the required transitional update is complete, the control plane reboot to complete the upgrade to the new software version; and during the control plane reboot, processing network traffic data units using a data plane of the network device.

10. The non-transitory computer readable medium of claim 9, wherein the method further comprises, before installing the required transitional update:

performing a check to determine whether the required transitional update comprises a command handler update;

installing, when the check determines that the required transitional update includes the command handler update, the command handler update at a pre-determined location to obtain an updated interim command handler; and using the updated interim command handler for continuing the installing of the required transitional update and the control plane reboot.

11. The non-transitory computer readable medium of claim 9, wherein the method further comprises, before receiving the command;

backing up a currently executing software instance of the network device;

storing the software image on a storage device of the network device; and modifying a boot file of the network device to point to a location of the software image.

12. The non-transitory computer readable medium of claim 11, wherein the method further comprises:

performing, when the query determines that no required transitional update is included in the software image, the control plane reboot without installing any required transitional update.

13. The non-transitory computer readable medium of claim 9, wherein performing the query comprises determining a current software version executing on the network device and platform information of the network device.

14. The non-transitory computer readable medium of claim 13, wherein performing the query further comprises using the current software version and the platform information to identify the required transitional update and obtain the required transitional update from the transitional update database.

15. The non-transitory computer readable medium of claim 14, wherein the platform information comprises one selected from a group consisting of device model information, backplane information, family of models information, information related to another component of the network device, versions of other software executing on the network device, and connection information.

16. The non-transitory computer readable medium of claim 9, wherein the method further comprises, after fully rebooting the control plane, restarting the data plane of the network device.

17. A network device, comprising:
a processor;
memory;
a network device data repository configured to store a software image comprising a new software version and a transitional update database comprising a transitional update;
a command interface configured to:
receive a command to initiate a control plane reboot of a control plane of the network device; and
transmit the command to a command handler;
the command handler configured to:
receive the command from the command interface;
parse the command;
extract, based on the command, the transitional update database from the software image;
perform a query to determine whether the transitional update database includes a required transitional update for performing an upgrade to the new software version;
install, when the query determines that the required transitional update is included in the software image, the required transitional update; and
perform, after installation of the transitional update is complete, the control plane reboot to complete the upgrade to the new software version,
wherein, during the control plane reboot, network traffic data units are processed using a data plane of the network device.

18. The network device of claim 17, wherein the command handler is further configured to:

perform a check to determine whether the required transitional update comprises a command handler update;

install, when the check determines that the required transitional update includes the command handler update, the command handler update at a pre-determined location to obtain an updated interim command handler; and use the updated interim command handler for continuing the install of the required transitional update and the control plane reboot.

19. The network device of claim 17, wherein the command handler, before receiving the command, is further configured to:

back up a currently executing software instance of the network device;

store the software image on a storage device of the network device; and modify a boot file of the network device to point to a location of the software image.

20. The network device of claim 17, wherein the command handler is further configured to perform the query by determining a current software version executing on the network device and platform information of the network device.

* * * * *